UNITED STATES PATENT OFFICE.

PETER HAUPTMANN, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

WOOL-DYE.

1,199,890.  Specification of Letters Patent.  Patented Oct. 3, 1916.

No Drawing. Application filed January 20, 1915, Serial No. 3,268. Renewed August 19, 1916. Serial No. 115,915.

*To all whom it may concern:*

Be it known that I, PETER HAUPTMANN, doctor of philosophy, chemist, citizen of the German Empire, residing at Leverkusen, near Cologne, Germany, have invented new and useful Improvements in Wool-Dye, of which the following is a specification.

I have found that new and valuable azo dyestuffs can be obtained by coupling with azo dyestuff components the diazo compounds of phenylenediamins of the following general formula:

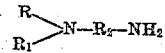

R standing for an organic radical, e. g.

$C_2H_5-$, $C_6H_5-$, $C_6H_5-CH_2-$,

R' for an acidyl radical e. g.

$C_6H_5-CO-$, $CH_3-O-C_6H_4-CO-$, and $R_2$ for an arylen radical, especially of the benzene series, e. g.

$-C_6H_4-$, $-C_6H_3-\overset{CH_3}{\phantom{-}}$, $-C_6H_2\overset{CH_3}{\underset{CH_3}{\diagdown}}$ As azo dyestuff components can be used, pyrazolone sulfonic acids, methyl-ketolesulfonic acid, alpha- and beta-naphthol sulfonic acids, acidyl-periaminonaphthol sulfonic acids, etc.

The new dyes are after being dried and pulverized dark powders soluble in water and dyeing wool from acid baths from yellow to bluish-red to brown shades fast to fulling. They are broken up upon treatment with stannous chlorid and hydrochloric acid, the above defined bases and aromatic amino compounds being obtained.

In order to illustrate the new process more fully the following example is given, the parts being by weight:—23 parts of ethylbenzoyltoluylenediamin:

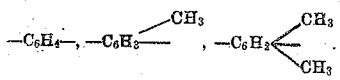

are dissolved in 250 parts of water and 20 parts of hydrochloric acid (19.5° Bé.) and the amino base is diazotized with 5 parts of sodium nitrate (100 per cent.) at 0° C. The diazo compound thus obtained is then slowly introduced into a solution of 21 parts of 1-naphthol-4-sulfonic acid in 200 parts of water containing 20 parts of calcined sodium carbonate. The crystalline dye is filtered off and dried. It is in the shape of the sodium salt a reddish-brown powder soluble in water with a bluish-red coloration. It dyes wool bright scarlet-red shades. In a free state it has most probably the formula:

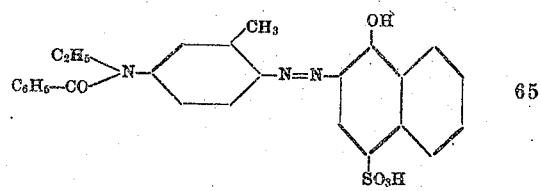

Upon treatment with stannous chlorid and hydrochloric acid ethylbenzoyltoluylenediamin and 2-amino-1-naphthol-4-sulfonic acid are obtained.

Other of the above bases may be used, such as the following alkylacidyl aminoarylamins, ethyl- or methylbenzoyl-para-phenylenediamin, ethylbenzoyl - xylylenediamin, methylbenzoyltoluylenediamin, ethyl-orthochlorobenzoyl - para - phenylenediamin or phenylbenzoyl-para-phenylenediamin, etc. Other azo dyestuff components can be used, e. g. 2 - phenylamino - 8 - naphthol-6-sulfonic acid, 1-benzoylamino-8-naphthol-4.6-disulfonic acid, 1 - naphthol - 3 - sulfonic acid, phenylmethylpyrazolone sulfonic acid, etc.

I claim:—

1. The herein described azo dyestuffs being obtainable from diazo compounds of arylenediamins and azo dyestuff components, which are after being dried dark powders soluble in water; yielding upon treatment with stannous chlorid and hydrochloric acid aromatic amino compounds and arylenediamin one of the amino groups of which is disubstituted by an acidyl radical and an organic radical respectively; and dyeing wool from acid baths from yellow to bluish-red to brown shades fast to fulling, substantially as described.

2. The herein described azo dyestuffs being obtainable from diazo compounds of arylenediamins of the benzene series and azo dyestuff components, which are after being dried dark powders soluble in water; yielding upon treatment with stannous chlorid and hydrochloric acid aromatic amino compounds and arylenediamins of the benzene series one of the amino groups of which is disubstituted by an acidyl radical and an organic radical respectively; and dyeing wool from acid baths from yellow to bluish-red to brown shades fast to fulling, substantially as described.

3. The herein described azo dyestuffs being obtainable from diazo compounds of arylenediamins of the benzene series and azo dyestuff components, which are after being dried dark powders soluble in water; yielding upon treatment with stannous chlorid and hydrochloric acid aromatic amino sulfonic acids and arylenediamins of the benzene series one of the amino groups of which is disubstituted by an acidyl radical and an organic radical respectively; and dyeing wool from acid baths from yellow to bluish-red to brown shades fast to fulling, substantially as described.

4. The herein described azo dyestuffs obtainable from diazo compounds of toluylenediamins and azo dyestuff components, which are after being dried dark powders soluble in water; yielding upon treatment with stannous chlorid and hydrochloric acid aromatic amino compounds and toluylenediamins which are acidylamido compounds; and dyeing wool from acid baths shades fast to fulling, substantially as described.

5. The herein described azo dyestuffs obtainable from diazo compounds of toluylenediamins and azo dyestuff components, which are after being dried dark powders soluble in water; yielding upon treatment with stannous chlorid and hydrochloric acid aminonaphthol sulfonic acids and toluylenediamins which are acidylamido compounds; and dyeing wool from acid baths generally reddish shades fast to fulling, substantially as described.

6. The herein described azo dyestuffs obtainable from diazo compounds of arylenediamins and aromatic sulfonic acids, which are after being dried dark powders soluble in water; yielding upon treatment with stannous chlorid and hydrochloric acid alkylacidylamidoarylamins and aromatic aminosulfonic acids; and dyeing wool from acid baths shades fast to fulling, substantially as described.

7. The herein described azo dyestuff having in a free state most probably the formula:

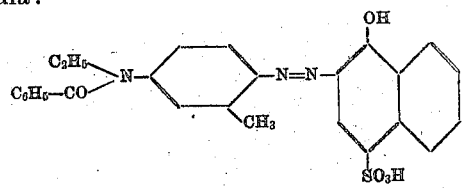

which is after being dried and pulverized a reddish-brown powder soluble in water; yielding upon treatment with stannous chlorid and hydrochloric acid ethylbenzoyltoluylenediamin and 2-amino-1-naphthol-4-sulfonic acid; and dyeing wool from acid baths bright scarlet-red shades fast to fulling, substantially as described.

In testimony whereof I have hereunto set my hand in the presence of two subscribing witnesses.

PETER HAUPTMANN. [L. S.]

Witnesses:
 HELEN NUFER,
 ALBERT NUFER.